(12) United States Patent
Yamaguchi et al.

(10) Patent No.: US 10,253,828 B2
(45) Date of Patent: Apr. 9, 2019

(54) DRIVING DEVICE AND IMAGE FORMING APPARATUS INCLUDING THE SAME

(71) Applicant: KYOCERA Document Solutions Inc., Osaka (JP)

(72) Inventors: Akihiro Yamaguchi, Osaka (JP); Yasutaka Hashimoto, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 478 days.

(21) Appl. No.: 15/219,683

(22) Filed: Jul. 26, 2016

(65) Prior Publication Data

US 2017/0031282 A1 Feb. 2, 2017

(30) Foreign Application Priority Data

Jul. 27, 2015 (JP) ................. 2015-147525

(51) Int. Cl.
| | |
|---|---|
| *F16D 27/06* | (2006.01) |
| *F16D 11/14* | (2006.01) |
| *F16D 27/04* | (2006.01) |
| *H02K 7/108* | (2006.01) |
| *G03G 15/00* | (2006.01) |
| *F16H 1/08* | (2006.01) |
| *F16D 1/08* | (2006.01) |

(52) U.S. Cl.
CPC ............. *F16D 27/06* (2013.01); *F16D 11/14* (2013.01); *F16D 27/04* (2013.01); *G03G 15/6529* (2013.01); *H02K 7/1085* (2013.01); *F16D 1/0876* (2013.01); *F16H 1/08* (2013.01); *G03G 2215/00675* (2013.01); *G03G 2221/1657* (2013.01)

(58) Field of Classification Search
CPC .......... F16D 27/06; F16D 11/14; F16D 27/04; F16D 1/0876
See application file for complete search history.

(56) References Cited

U.S. PATENT DOCUMENTS

| | | | | |
|---|---|---|---|---|
| 4,970,561 A | * | 11/1990 | Mizuno ............... | G03G 15/0126 399/228 |
| 5,099,278 A | * | 3/1992 | Sato .................... | G03G 15/0126 399/343 |
| 5,794,529 A | * | 8/1998 | Dawley ................. | B41F 13/008 101/216 |

(Continued)

FOREIGN PATENT DOCUMENTS

JP 2008-151246 7/2008

*Primary Examiner* — David M Fenstermacher
(74) *Attorney, Agent, or Firm* — Wenderoth, Lind & Ponack, L.L.P.

(57) ABSTRACT

An image forming apparatus includes an output shaft including a columnar part and a D cut part connected to the columnar part and having a D section, and an electromagnetic clutch including a cylindrical member fitted to the output shaft. The image forming apparatus further includes a key member. The key member includes a conductive member. When the D cut part of the output shaft is employed as an insertion tip side and the output shaft has been inserted to the cylindrical member from one side in an axial direction, the key member is configured to fill a space between the sectional circular part of the inner peripheral surface of the cylindrical member and the D cut part of the output shaft.

6 Claims, 7 Drawing Sheets

(56) References Cited

U.S. PATENT DOCUMENTS

| | | | | |
|---|---|---|---|---|
| 5,820,280 A * | 10/1998 | Fox | ............. | B41J 29/38 |
| | | | | 400/611 |
| 5,902,058 A * | 5/1999 | Koike | ............. | B65H 5/06 |
| | | | | 400/567 |
| 7,306,216 B2 * | 12/2007 | Lee | ............. | B65H 3/08 |
| | | | | 271/10.01 |
| 7,669,496 B2 * | 3/2010 | Takahashi | ............. | F16D 7/044 |
| | | | | 192/46 |
| 8,276,474 B2 * | 10/2012 | Kim | ............. | G03G 15/757 |
| | | | | 74/10.39 |
| 8,428,494 B2 * | 4/2013 | Ino | ............. | F16H 27/08 |
| | | | | 399/222 |
| 8,439,152 B2 * | 5/2013 | Visscher | ............. | B60K 17/342 |
| | | | | 180/444 |
| 8,485,055 B2 * | 7/2013 | Gumpoltsberger | ............. | F16H 3/006 |
| | | | | 74/330 |
| 8,503,910 B2 * | 8/2013 | Matsuda | ............. | G03G 15/5008 |
| | | | | 399/117 |
| 8,579,277 B2 * | 11/2013 | Okamoto | ............. | B65H 3/0684 |
| | | | | 271/109 |
| 9,010,527 B2 * | 4/2015 | Ishii | ............. | B65G 13/06 |
| | | | | 198/832 |

* cited by examiner

One side ←— Axial direction —→ Other side

DRIVING DEVICE AND IMAGE FORMING APPARATUS INCLUDING THE SAME

CROSS-REFERENCE TO RELATED APPLICATION

This application is based upon and claims the benefit of priority from Japanese Patent Application No. 2015-147525 filed on Jul. 27, 2015, the entire contents of which are incorporated herein by reference.

BACKGROUND

The technology of the present disclosure relates to a driving device and an image forming apparatus including the same.

Conventionally, there has been known a driving device including an electromagnetic clutch that switches the transmission and blocking of driving force between a driving source and an output shaft.

The aforementioned electromagnetic clutch includes a cylindrical member fitted to an output shaft, a rotor fitted to the cylindrical member and fixed thereto, an armature arranged to face the rotor in an axial direction, and an electromagnetic coil part arranged at an opposite side of the armature in the rotor. The electromagnetic coil part acts magnetic force on the armature, thereby switching a power transmission state in which the armature abuts the rotor and a blocking state in which the abutting has been blocked.

The output shaft has a columnar part and a D cut part connected to the columnar part and having a sectional D shape. An inner peripheral surface of the cylindrical member is configured with a part having a circular section and a part having a sectional D shape, which is positioned closer to one side in an axial direction than the part having a circular section. The D cut part of the aforementioned shaft engages with the part having a sectional D shape, so that the shaft and the cylindrical member integrally rotate.

SUMMARY

A driving device according to one aspect of the present disclosure includes an output shaft, a cylindrical member, a first clutch member, a second clutch member, an exciting coil, a control unit, and a key member.

The output shaft includes a columnar part and a D cut part. The D cut part is a part connected to the columnar part and having a sectional D shape. The cylindrical member forms a cylindrical shape fitted to the aforementioned output shaft. An inner peripheral surface of the cylindrical member is configured with a sectional circular part engageable with the aforementioned columnar part and a sectional D-shaped part positioned closer to one side in an axial direction than the sectional circular part and engageable with the aforementioned D cut part. The first clutch member and the second clutch member are supported to an outer peripheral surface of the cylindrical member. The exciting coil generates magnetic force. The control unit switches the energizing and non-energizing of the exciting coil, thereby selectively switching a power transmission state, in which the first clutch member abuts the second clutch member, and a power blocking state in which the abutting has been blocked. The key member includes a conductive material. When the D cut part of the output shaft is employed as an insertion tip side and the output shaft has been inserted to the cylindrical member from one side in the aforementioned axial direction, the key member is configured to fill a space between the sectional circular part of the inner peripheral surface of the cylindrical member and the D cut part of the output shaft.

An image forming apparatus according to another aspect of the present disclosure includes the aforementioned driving device.

DETAILED DESCRIPTION

Hereinafter, an example of an embodiment of a technology of the present disclosure will be described in detail on the basis of the drawings. It is noted that the technology of the present disclosure is not limited to the following embodiments.

Embodiment

Figure 1:
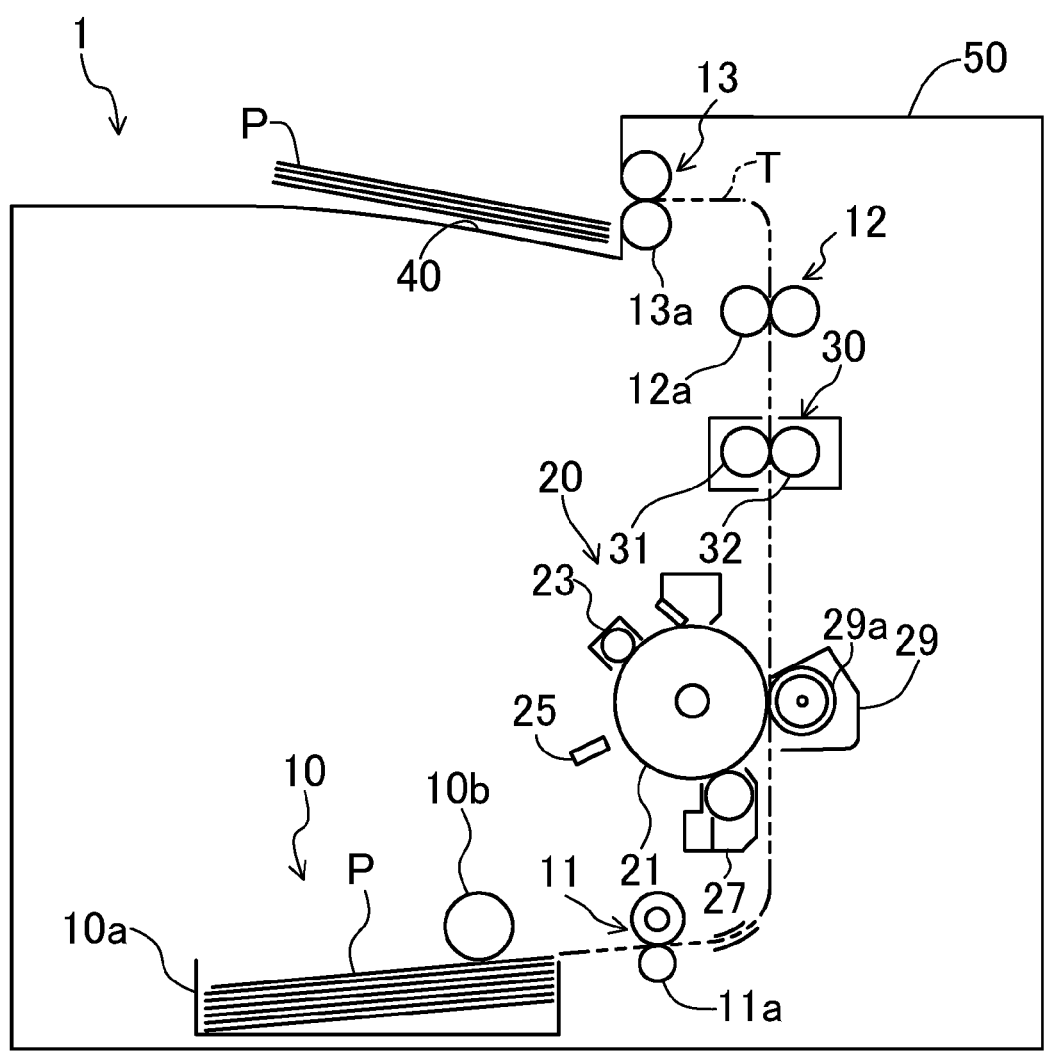
FIG. 1 is a schematic configuration diagram illustrating an image forming apparatus having a driving device in an embodiment.

FIG. 1 illustrates an image forming apparatus 1 including a driving device 60 in the present embodiment. The image forming apparatus 1 includes a monochrome laser printer in the present embodiment.

The image forming apparatus 1 has a paper feeding unit 10, an image forming unit 20, a fixing unit 30, a paper discharge unit 40, and a casing 50. On a paper conveyance path T from the paper feeding unit 10 to the paper discharge unit 40, a plurality of conveying roller pairs 11 to 13 are arranged to convey a paper P while interposing it therebetween.

The aforementioned paper feeding unit 10 is arranged at a lower portion of the casing 50. The paper feeding unit 10 has a paper feeding cassette 10a in which the paper P having a sheet shape is received, and a pick-up roller 10b for taking out the paper P in the paper feeding cassette 10a and sending out the paper P to an exterior of the cassette. The paper P sent out to the exterior of the cassette from the paper feeding cassette 10a is supplied to the image forming unit 20 via the conveying roller pair 11.

The image forming unit 20 has a photosensitive drum 21, a charging device 23, an exposure device 25, a developing device 27, a transfer device 29, and a toner container (not illustrated). In the image forming unit 20, the peripheral surface of the photosensitive drum 21 is charged by the charging device 23, and then laser light based on document image data (for example, image data of a document image received from an external terminal) is irradiated to the surface of the photosensitive drum 21 by the exposure device 25, so that an electrostatic latent image is formed. The electrostatic latent image formed (carried) on the surface of the photosensitive drum 21 is developed by the developing device 27 as a toner image. The toner image developed by the developing device 27 is transferred to the paper P supplied from the paper feeding unit 10 by the transfer device 29. The paper P after the transfer is supplied to the fixing unit 30 by a transfer roller 29a of the transfer device 29 and the photosensitive drum 21.

The fixing unit 30 has a heating roller 31 and a pressure roller 32 brought into press contact with the heating roller 31 with predetermined pressing load. Inside the heating roller 31, a halogen lamp (not illustrated) serving as a heating means is arranged. A peripheral surface of the heating roller 31 is heated by heat generated from the halogen lamp.

The fixing unit 30 presses and heats the paper P supplied from the aforementioned image forming unit 20 between the heating roller 31 and the pressure roller 32, thereby fixing the toner image to the paper P. Then, the paper P with the toner image fixed by the fixing unit 30 is sent out to a downstream side by the aforementioned both rollers 31 and 32. The sent paper P is discharged to the paper discharge unit 40 formed on an upper surface of the casing 50 by the plurality of conveying roller pairs 12 and 13 provided along the paper conveyance path T.

Figure 2:
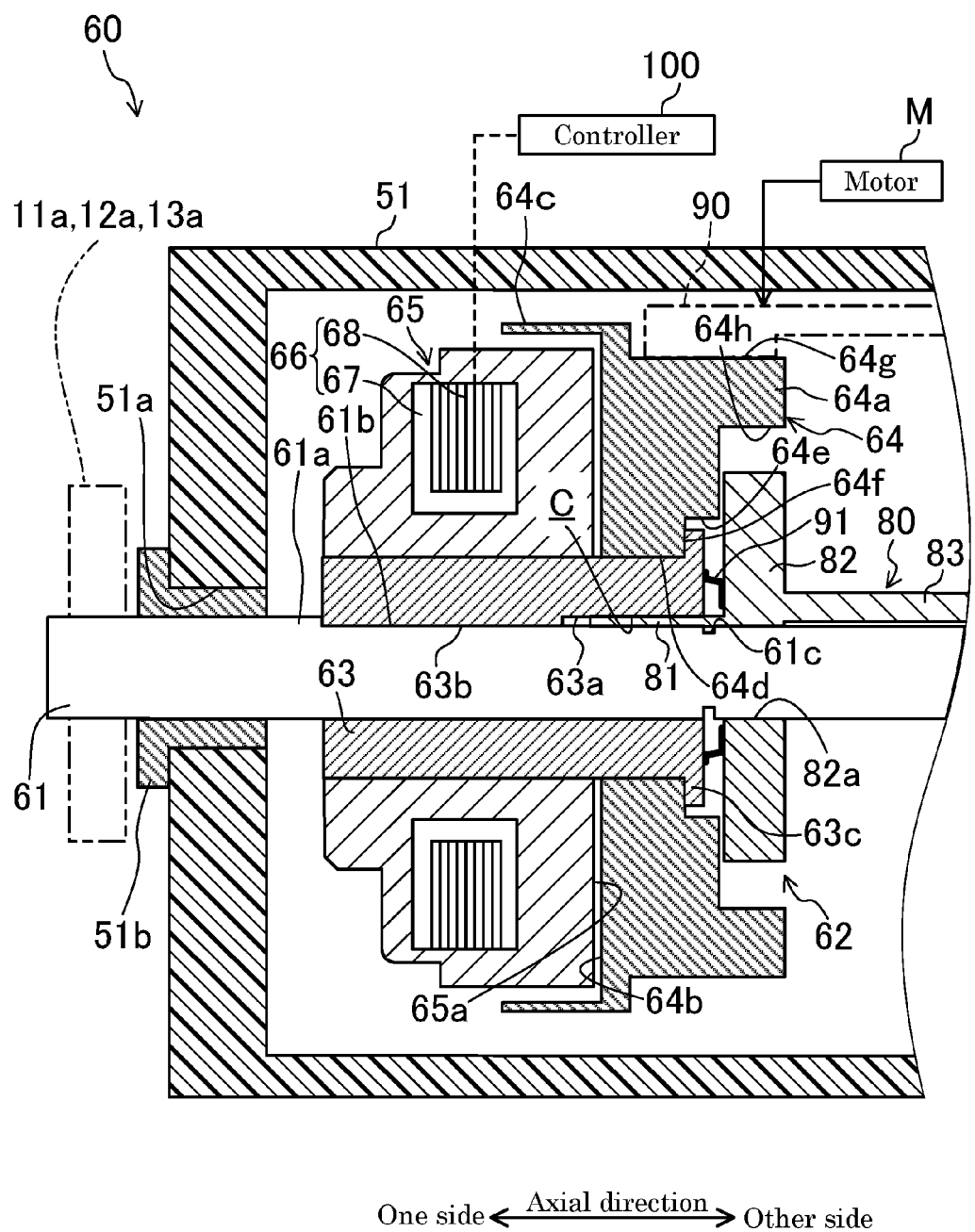
FIG. 2 is a sectional view taken along plane extending along a rotating shaft of a driving device in a power blocking state.

FIG. 2 is a sectional view of the driving device 60 that drives the conveying roller pairs 11 to 13. The driving device 60 has an output shaft 61, an electromagnetic clutch 62, and a key member 80.

The output shaft 61 horizontally extends along a front and rear direction of the image forming apparatus 1. The output shaft 61 has a columnar part 61a and a D cut part 61b connected to the columnar part 61a and having a sectional D shape. The D cut part 61b has a shape formed by notching a part of a columnar peripheral surface, which has the same diameter as that of the columnar part 61a, in a flat shape.

At a boundary between the columnar part 61a and the D cut part 61b of the output shaft 61, a stepped surface is formed. The stepped surface abuts one side end surface in an axial direction of a cylindrical member 63 which will be described later, so that movement of the output shaft 61 to the other side in the axial direction is restrained. The D cut part 61b of the output shaft 61 is formed at an intermediate portion in a longitudinal direction thereof with an annular groove 61c. The annular groove 61c is mounted with a snap ring (not illustrated), wherein the snap ring abuts the other side end surface in the axial direction of the cylindrical member 63, so that movement of the output shaft 61 to one side in the axial direction is restrained.

The columnar part 61a of the output shaft 61 passes through a cover member 51. The cover member 51 forms a cap shape that is opened to the other side in the axial direction, and is fixed to the sidewall surface of the aforementioned casing 50 (illustrated only in FIG. 1) so as to cover the electromagnetic clutch 62. The cover member 51 is formed at a wall portion thereof at one side in the axial direction with a bearing hole 51a. Into the bearing hole 51a, a bearing 51b is fitted. The columnar part 61a of the output shaft 61 is supported to the bearing 51b so as to be rotatable. At a part of the columnar part 61a, which protrudes to an outer side of the cover from the bearing hole 51a, driving rollers 11a to 13a of the conveying roller pairs 11 to 13 are integrally and rotatably fixed.

The aforementioned electromagnetic clutch 62 switches a power transmission state in which rotary driving force of a motor M serving as a driving source is transmitted to the output shaft 61 and a blocking state in which the transmission has been blocked. In detail, the electromagnetic clutch 62 includes a cylindrical member 63 fitted to the output shaft 61, a first clutch member 64 fitted to an outer peripheral surface of the cylindrical member 63 so as to be slidable in the axial direction and a rotation direction, a second clutch member 65 fitted to and fixed to the outer peripheral surface of the cylindrical member 63, and an electromagnetic coil part 66 embedded in the second clutch member 65.

The aforementioned cylindrical member 63, for example, is configured with a metal material such as SECC. The outer peripheral surface of the cylindrical member 63 is formed in a cylindrical surface shape. An inner peripheral surface of the cylindrical member 63 is configured with a sectional circular part 63a having a circular section when viewed from the axial direction and a sectional D-shaped part 63b having a section D shape. The sectional D-shaped part 63b is positioned closer to one side in the axial direction than the sectional circular part 63a and engages with the D cut part 61b of the output shaft 61. In this way, the output shaft 61 and the cylindrical member 63 are integrally rotatable. At the other side end portion in the axial direction of the cylindrical member 63, a flange part 63c is formed to protrude radially outside in a flange shape and restrain the movement of the first clutch member 64 to the other side of the axial direction.

The aforementioned first clutch member 64 has an annular clutch body 64a formed so as to surround the outer peripheral surface of the cylindrical member 63 and a cylindrical outer cover 64c connected to one side end portion in the axial direction of the clutch body 64a.

The clutch body 64a, for example, is configured by a metal material such as SECC. The clutch body 64a is formed at an axial center portion thereof with a through hole 64d through which the cylindrical member 63 passes. At the other side in the axial direction of the through hole 64d, a first hole 64e having a diameter larger than that of the through hole 64d is formed. At a boundary between the aforementioned through hole 64d and the aforementioned first hole 64e, a stepped surface 64f is formed. The stepped surface 64f is abutted by the flange part 63c of the cylindrical member 63, so that the movement of the first clutch member 64 to the other side of the axial direction is restrained. Moreover, at the other side in the axial direction of the aforementioned first hole 64e, a second hole 64h having a diameter larger than that of the first hole 64e is formed. In the second hole 64h, a disc part 82 of the key member 80, which will be described later, is arranged.

Over the entire periphery of an outer peripheral surface of the aforementioned clutch body 64a, a gear portion 64g is formed. The gear portion 64g includes a helical gear having tooth traces inclined with respect to the axial direction of the clutch body 64a. The gear portion 64g engages with a speed reduction gear 90 connected to the motor M. The end surface of one side in the axial direction of the clutch body 64a abuts the second clutch member 65, thereby serving as a friction surface 64b that transmits rotary driving force.

The aforementioned outer cover 64c, for example, is configured with a resin material. The outer cover 64c is formed to extend to one side in the axial direction from a flange part slightly protruding radially outside from the outer peripheral surface of the clutch body 64a, thereby surrounding an outer peripheral surface of the second clutch member 65. Between an inner peripheral surface of the cylindrical outer cover 64c and the outer peripheral surface of the second clutch member 65, an annular space opened to one side in the axial direction is formed.

The aforementioned second clutch member 65, for example, is configured with a metal material such as SECC. The second clutch member 65 is formed in an annular shape that surrounds the cylindrical member 63 and is arranged closer to one side in the axial direction than the first clutch member 64. The end surface (a surface of the first clutch member 64 side) of the second clutch member 65 at the other side of the axial direction abuts the friction surface 64*b* of the first clutch member 64, thereby serving as a friction surface 65*a* that transmits rotary driving force.

The aforementioned electromagnetic coil part 66 has a bobbin 67 and an exciting coil 68 wound around the bobbin 67. The exciting coil 68 is configured to be switched to a energizing state and a non-energizing state by a controller 100 serving as a control unit. When the exciting coil 68 is in the non-energizing state, the friction surface 64*b* of the first clutch member 64 and the friction surface 65*a* of the second clutch member 65 are separated from each other (see FIG. 2). In this separation state, even though the motor M rotates, the first clutch member 64 only has to idle with respect to the cylindrical member 63, so that the second clutch member 65 and the output shaft 61 do not rotate.

Figure 3:
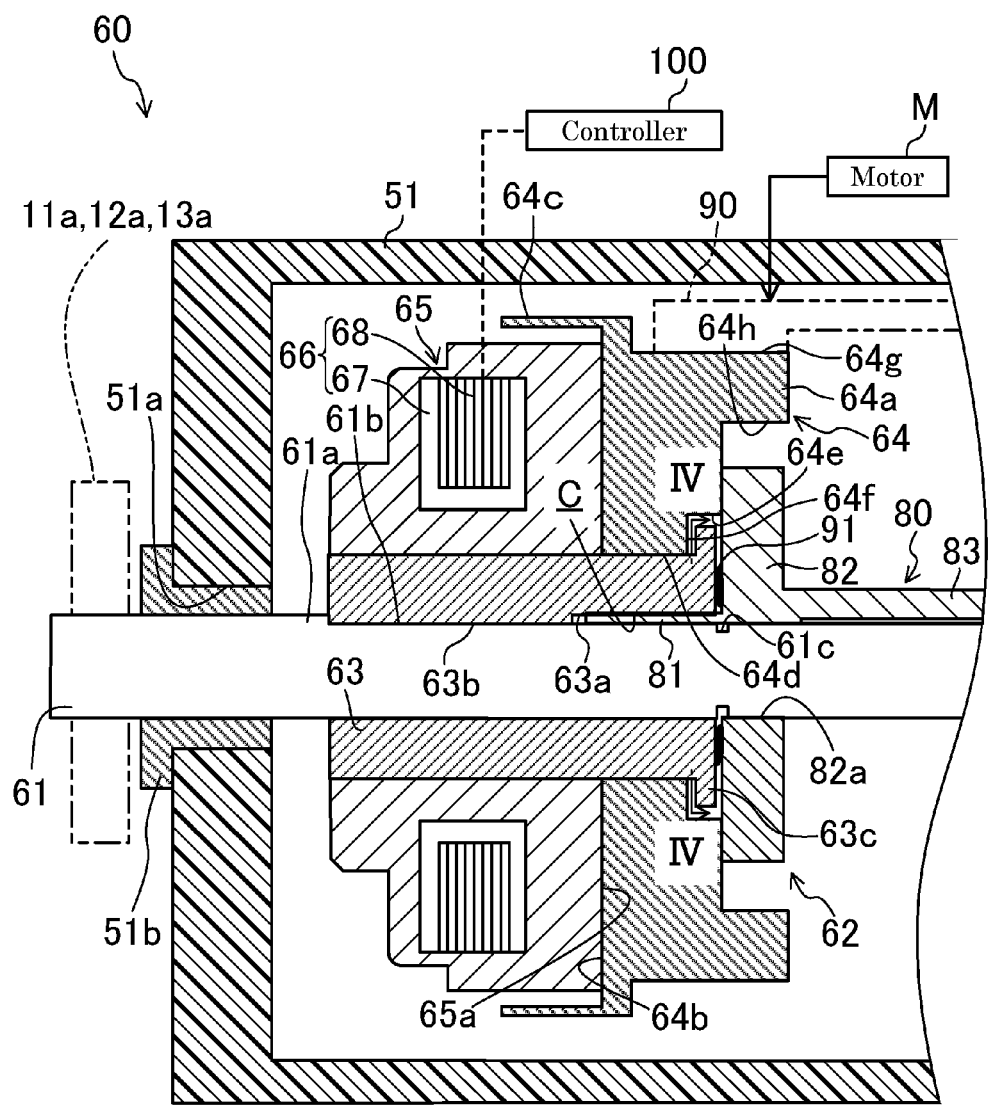
FIG. 3 is a diagram corresponding to FIG. 2, which illustrates a driving device in a power transmission state.
Figure 4:
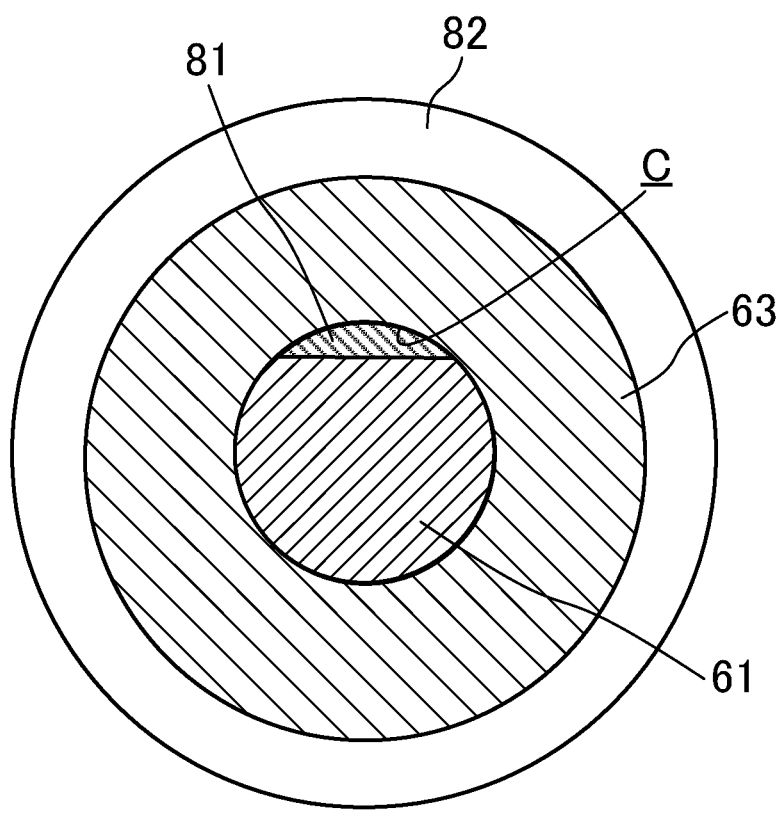
FIG. 4 is a sectional view taken along line IV-IV of FIG. 3.
Figure 5:
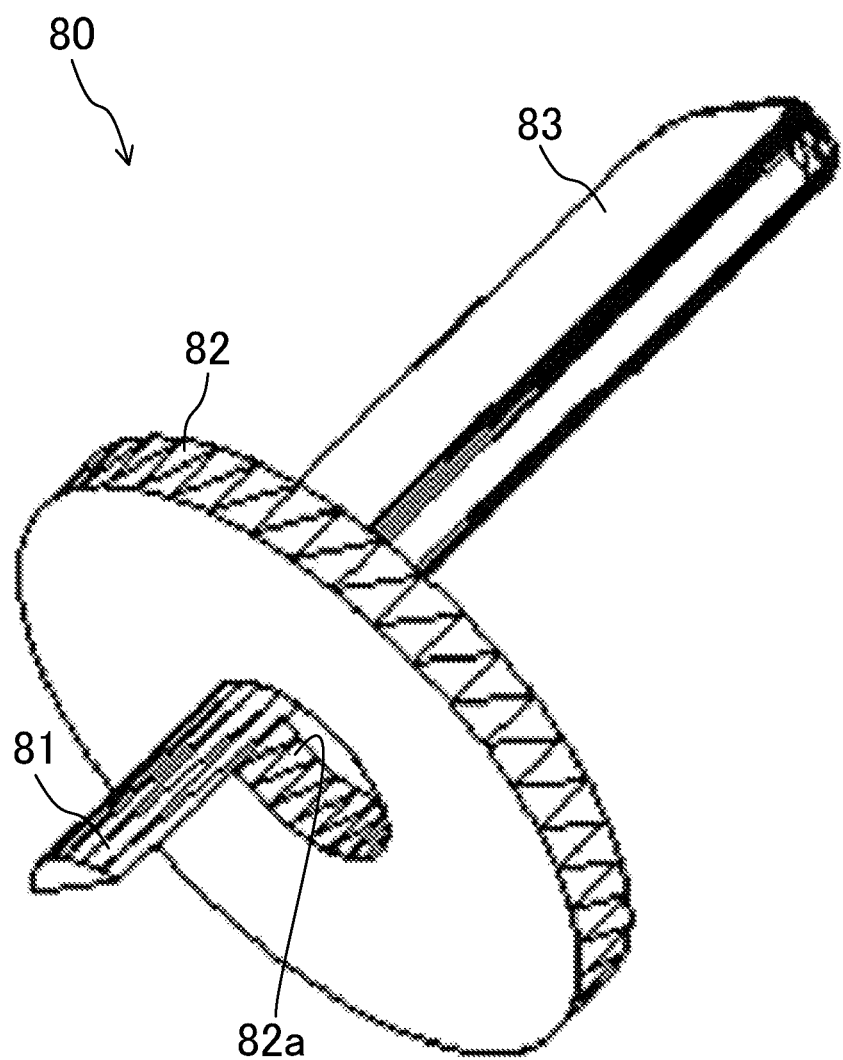
FIG. 5 is a perspective view illustrating a key member.
Figure 6:
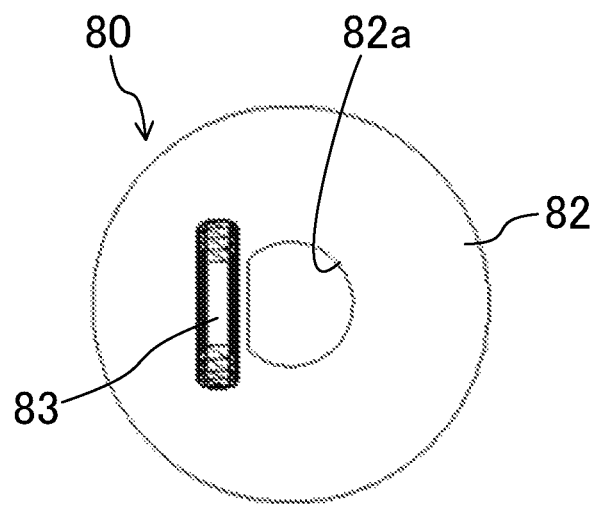
FIG. 6 is a trihedral view illustrating a key member.
Figure 6:
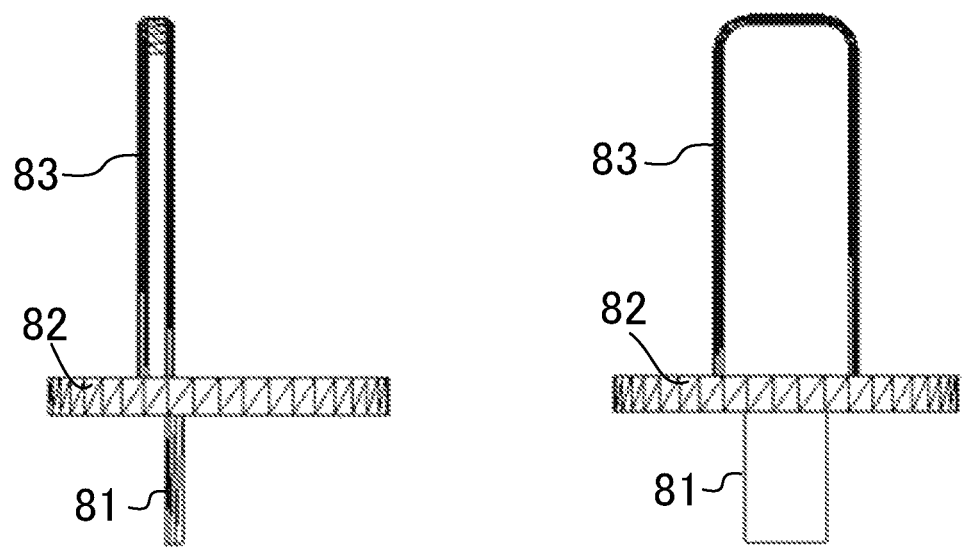

On the other hand, when the exciting coil 68 is energized by the controller 100, the first clutch member 64 moves to one side in the axial direction by magnetic attraction force and is brought into press contact with the second clutch member 65 (see FIG. 3). As a consequence, the rotary driving force of the motor M is transmitted to the output shaft 61 via the first clutch member 64, the second clutch member 65, and the cylindrical member 63 in this order. Thereafter, when the energizing of the exciting coil 68 is blocked by the controller 100, the first clutch member 64 is separated from the second clutch member 65 and returns to the original position. The separation movement of the first clutch member 64 is performed using axial restoring force acting on the gear portion 64*g* of the first clutch member 64. This restoring force is generated because the gear portion 64*g* is configured with a helical gear. It is noted that in order to move the first clutch member 64 so as to be separated from the second clutch member 65, for example, an urging member such as a disc spring may be used.

Figure 7:
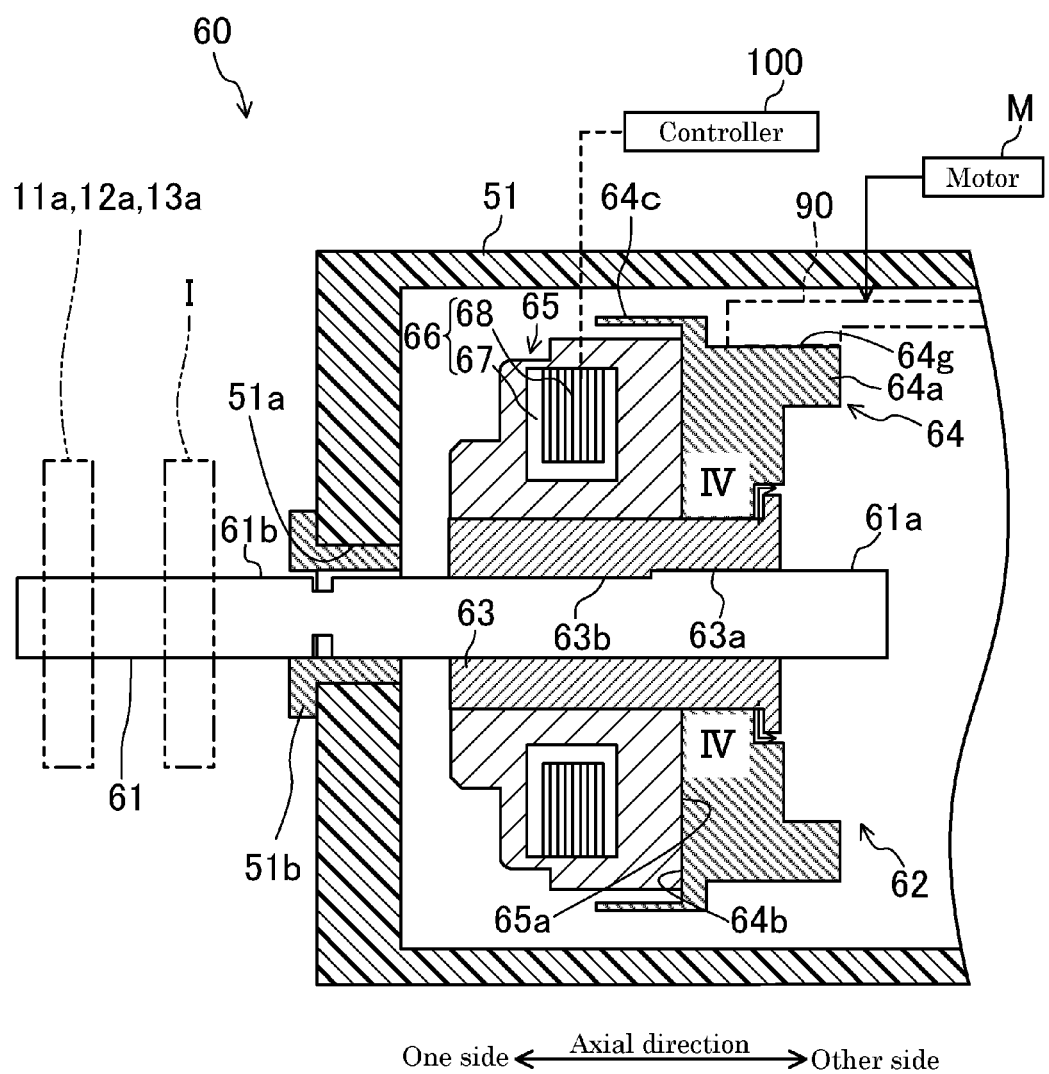
FIG. 7 is a diagram corresponding to FIG. 3, which illustrates a comparison example.

In the aforementioned driving device 60, when the D cut part 61*b* side of the output shaft 61 has been employed as an insertion tip side, connecting force of both clutch members 64 and 65 in the aforementioned power transmission state differ from each other according to whether the output shaft 61 is inserted into the cylindrical member 63 from the other side in the axial direction or inserted from one side thereof. That is, in the former case, as illustrated in FIG. 7, since the columnar part 61*a* of the output shaft 61 passes through the sectional circular part 63*a* of the inner peripheral surface of the cylindrical member 63, no space occurs between the cylindrical member 63 and the output shaft 61. However, in the latter case, since the D cut part 61*b* of the output shaft 61 is configured to pass through the sectional circular part 63*a* of the cylindrical member 63, a space C occurs between the inner peripheral surface (the sectional circular part 63*a*) of the cylindrical member 63 and the D cut part 61*b* of the output shaft 61 as illustrated in FIG. 2. Therefore, as compared with the case in which there is no space C, since magnetic force acting on the first clutch member 64 by the exciting coil 68 is reduced, the connecting force of both clutch members 64 and 65 may be reduced. In this regard, in the present embodiment, the driving device 60 includes the key member 80 for filling the space C.

As illustrated in FIG. 2 to FIG. 6, the key member 80 is an integrally molded article including a conductive material and has a key body 81, a disc part 82 serving as a plate-shaped part, and a rectangular plate part 83. Preferably, the key member 80 is configured with the same material as that of the first clutch member 64 and the second clutch member 65, and in the present embodiment, the key member 80 is configured with a conductive metal material (for example, SECC). It is noted that the key member 80 is not limited to the conductive metal material and may be formed by a conductive resin.

The aforementioned key body 81 forms a sectional D-shaped columnar shape which fits in the space C. The key body 81 is inserted into the space C from the other side toward one side in the axial direction. The fitting accuracy of the key body 81 with respect to the space C is set such that the key body 81 can slidably move in the axial direction.

The disc part 82 is connected to the other end portion in the axial direction of the key body 81. The disc part 82 is formed in a disc shape vertical to the aforementioned axial direction. The disc part 82 is formed at an axial center portion thereof with a through hole 82*a* which engages with the D cut part 61*b* of the output shaft 61. A diameter of the disc part 82 is larger than a diameter of the through hole 64*d* and a diameter of the first hole 64*e* formed in the aforementioned first clutch member 64.

The rectangular plate part 83 is connected to the other side surface in the axial direction of the disc part 82. The rectangular plate part 83 extends along the axial direction, and a slight space is formed between the rectangular plate part 83 and the D cut part 61*b* of the output shaft 61. The rectangular plate part 83 is used as a grip part when a worker inserts the key member 80 (the key body 81) into the space C.

Between the disc part 82 of the aforementioned key member 80 and the cylindrical member 63, an urging member 91 (see FIG. 2 and FIG. 3) is provided. The urging member 91, for example, is configured with a leaf spring. The urging member 91 receives compressive load in the axial direction, thereby urging the key member 80 from one side to the other side in the axial direction.

In the aforementioned driving device 60, when the exciting coil 68 is in the non-energizing state, a space occurs between one side surface in the axial direction of the disc part 82 of the key member 80 and the first clutch member 64 as illustrated in FIG. 2. When the exciting coil 68 is switched to the energizing state by the controller 100, magnetic attraction force acts on the key member 80 by the exciting coil 68. As a consequence, the key member 80 moves to one side from the other side in the axial direction against the urging force of the urging member 91, so that the disc part 82 of the key member 80 is pressed to the first clutch member 64. In this state, about 80% of the aforementioned space C is filled with the key body 81 of the key member 80. Preferably, an occupancy rate of the key body 81 in the space C is high, and more preferably, the occupancy rate is 100%.

Thereafter, when the exciting coil 68 is switched to the non-energizing state again by the controller 100, since no magnetic attraction force acts on the first clutch member 64 by the exciting coil 68, the first clutch member 64 moves from one side to the other side in the axial direction by the urging force of the urging member 91 and returns to the original position (the position of FIG. 2).

As described above, in the aforementioned embodiment, when the D cut part 61*b* of the output shaft 61 is employed as the insertion tip side and the output shaft 61 has been inserted into the cylindrical member 63 from one side (that is, a side at which the inner peripheral surface of the cylindrical member 63 forms a sectional D shape) in the aforementioned axial direction, the driving device 60 includes the metallic key member 80 (the key body 81) capable of filling the space C occurred between the sectional circular part 63*a* of the inner peripheral surface of the cylindrical member 63 and the D cut part 61*b* of the output shaft 61.

According to this, it is possible to sufficiently ensure magnetic force acting on the first clutch member 64 by the exciting coil 68 without inferiority as compared with the case of FIG. 7 (that is, the case in which the output shaft 61 is inserted into the cylindrical member 63 from the other side in the aforementioned axial direction). Consequently, it is possible to sufficiently ensure connecting force between the first clutch member 64 and the second clutch member 65 regardless of the insertion direction of the output shaft 61 with respect to the cylindrical member 63.

Furthermore, the space C is filled with the key body 81 of the key member 80, so that it is possible to sufficiently ensure support stiffness of the first clutch member 64 by the cylindrical member 63. Thus, it is possible to prevent the first clutch member 64 from being inclined with respect to a vertical surface in the aforementioned power transmission state. Accordingly, contact pressure of the first clutch member 64 and the second clutch member 65 is equalized, so that it is possible to prevent cut chips such as iron power from being generated.

Furthermore, in the aforementioned embodiment, the disc part 82 of the key member 80 receives magnetic force generated from the aforementioned exciting coil 68 in the aforementioned power transmission state, and is pressed with respect to the first clutch member 64 toward one side from the other side in the aforementioned axial direction.

In this way, it is possible to further enhance the connecting force between the first clutch member 64 and the second clutch member 65 in the aforementioned power transmission state.

In addition, the diameter of the aforementioned disc part is set to be larger than that of the through hole 64d formed in the first clutch member 64. Consequently, the disc part 82 is pressed to the first clutch member 64 so as to cover the entire through hole 64d in the power transmission state.

Consequently, it is possible to prevent lubricant such as grease from permeating into the electromagnetic clutch 62 through the through hole 64d by the disc part 82. In general, in the driving device 60 having the electromagnetic clutch 62, the use of lubricant is prohibited because it may cause the generation of slip of both clutch members 64 and 65. However, in the driving device 60 of the aforementioned embodiment, although lubricant has been used, the lubricant does not permeate between both clutch members 64 and 65. Consequently, conventionally prohibited lubricant becomes available, so that it is possible to reduce abrasion and noise of the constituent elements of the driving device 60.

Moreover, in the aforementioned embodiment, the urging member 91 is provided between the disc part 82 of the key member 80 and the cylindrical member 63. The urging member 91 urges the disc part 82 toward the other side from one side in the axial direction such that the disc part 82 is separated from the first clutch member 64 in the aforementioned power blocking state. According to this, it is possible to prevent the first clutch member 64 from rotating in the power blocking state while keeping the first clutch member 64 contacted with the disc part 82.

Moreover, in the aforementioned embodiment, the gear portion 64g formed on the outer peripheral surface of the first clutch member 64 is configured with a helical gear. Consequently, when the exciting coil 68 has been switched from a energizing state to a non-energizing state, urging force, by which the first clutch member 64 is separated from the second clutch member 65, can be obtained by engagement between the helical gear and the speed reduction gear 90. Thus, it is possible to reduce the cost of the driving device 60 by reducing the number of parts.

What is claimed is:
1. A driving device comprising:
an output shaft including a columnar part and a D cut part connected to the columnar part and having a sectional D-shape;
a cylindrical member forming a cylindrical shape fitted to the output shaft and having an inner peripheral surface configured with a sectional circular part engageable with the columnar part and a sectional D-shaped part positioned closer to one side in an axial direction than the sectional circular part and engageable with the D cut part;
a first clutch member and a second clutch member supported to an outer peripheral surface of the cylindrical member;
an exciting coil that generates magnetic force;
a control unit that switches energizing and non-energizing of the exciting coil, thereby selectively switching a power transmission state, in which the first clutch member abuts the second clutch member, and a power blocking state in which the abutting has been blocked; and
a key member including a conductive material, which fills a space between the sectional circular part of the inner peripheral surface of the cylindrical member and the D cut part of the output shaft when the D cut part of the output shaft is employed as an insertion tip side and the output shaft has been inserted to the cylindrical member from one side in the axial direction.

2. The driving device of claim 1, wherein the key member comprises:
a key body which is inserted into the space toward one side from the other side in the axial direction; and
a disc part connected to the other end portion in the axial direction of the key body and arranged vertically to the axial direction,
wherein the disc part receives magnetic force generated from the exciting coil in the power transmission state and is pressed with respect to the first clutch member toward one side from the other side in the axial direction.

3. The driving device of claim 2, wherein the first clutch member has a through hole through which the cylindrical member passes, and
the disc part is pressed to the first clutch member so as to cover an entire of the through hole when viewed from the axial direction in the power transmission state.

4. The driving device of claim 2, further comprising:
an urging member which is provided between the disc part of the key member and the cylindrical member and urges the disc part from one side in the axial direction to the other side such that the disc part is separated from the first clutch member in the power blocking state.

5. The driving device of claim 1, wherein the control unit is configured to energize the exciting coil in the power transmission state such that the first clutch member is drawn toward the second clutch member side by magnetic attraction force,
a gear portion engaging with a speed reduction gear connected to a driving source is formed on a peripheral surface of the first clutch member, and
the gear portion is a helical gear, and is configured to urge the first clutch member so as to be separated from the second clutch member when the energizing of the exciting coil has been blocked by the control unit.

6. An image forming apparatus including the driving device of claim 1.

* * * * *